United States Patent [19]

Nanno et al.

[11] Patent Number: 4,650,294

[45] Date of Patent: Mar. 17, 1987

[54] OBJECTIVE LENS APPARATUS

[75] Inventors: Ikuo Nanno; Yasuaki Morimoto; Seiji Hoshi; Shinji Wakui; Hideo Hoshi, all of Tokyo, Japan

[73] Assignee: Seiko Instruments & Electronics Ltd., Tokyo, Japan

[21] Appl. No.: 581,663

[22] Filed: Feb. 21, 1984

[30] Foreign Application Priority Data

Mar. 31, 1983 [JP] Japan .................. 58-57198

[51] Int. Cl.[4] .................. G02B 7/04; G02B 7/18
[52] U.S. Cl. .................. 350/484; 350/6.3
[58] Field of Search .................. 350/484, 6.2–6.4

[56] References Cited

U.S. PATENT DOCUMENTS 3,551,595 12/1970 De Vries .................. 350/6.4
3,591,249 7/1971 Wildhaber .................. 350/6.3
4,473,274 9/1984 Yano et al. .................. 350/6.3

Primary Examiner—John K. Corbin
Assistant Examiner—Rebecca D. Gass
Attorney, Agent, or Firm—Robert E. Burns; Emmanuel J. Lobato; Bruce L. Adams

[57] ABSTRACT

An objective lens apparatus for an optical disc player comprises an objective lens holder rotatable about a center axis, an objective lens carried by the holder at a location spaced from the center axis, an optical member, a magnetic flux generating member for generating magnetic flux, and tracking and focusing coils interacting with the magnetic flux for effecting tracking and focusing adjustments of the objective lens. The optical member rotates simultaneously with the lens holder and leads light which is incident along the center axis to the objective lens in a direction parallel to the center axis thereby eliminating optical modulation of the light caused by rotation of the lens holder in the tracking direction.

18 Claims, 8 Drawing Figures

OBJECTIVE LENS APPARATUS

BACKGROUND OF THE INVENTION

The present invention relates to an objective lens apparatus used for an optical disk player.

An objective lens apparatus whose objective lens holder is attached to a peripheral portion of a cylindrical shaft pivotably and slidably in the thrust direction has theretofore been used as an objective lens apparatus for an optical disk player. Namely, an objective lens of the objective lens apparatus is fit slightly eccentrically in the axial core of the objective lens holder so that the objective lens holder may pivot for tracking adjustment and may slide in the thrust direction for focal adjustment. This type of objective lens apparatus comprises a first coil for focal adjustment wound around the peripheral portion of the objective lens holder and a square second coil for tracking adjustment attached to overlie the first coil. The shaft serves also as one yoke portion. The other yoke portion has a notch portion at the outer periphery of the objective lens holder. A linear motor for driving the objective lens holder in the thrust direction is constructed by the first coil and a pair of yokes.

A pivotable motor for driving the objective lens holder is constructed by the second coil and the pair of yokes. The return path of the second coil is constructed to face the notch portion for producing the pivot moment in the objective lens holder by the electromagnetic force applied to the forward path of the second coil. The optical path of a laser beam reflected on a disk through the objective lens passes the path distant from the axial core of the objective lens holder.

The above-noted objective lens apparatus is disadvantageous in that the laser beam reflected on a disk through the objective lens is modulated especially by driving the objective lens in the tracking direction. Namely, the amount of light of the laser beam passing through the objective lens is at a maximum when the optical axis of the laser beam coincides with the optical axis of the objective lens, while the amount of light reduces when the optical axis of the laser beam separates from the optical axis of the objective lens. Moreover, the separation of the optical axis of the laser beam from that of the objective lens is disadvantageous as it causes the movement of the laser beam reflected on a disk through the objective lens, the loss of the amount of light, and polarization of intensity of the light distribution. The conventional objective lens apparatus is unable to shift the optical axis of the laser beam in accordance with the shift of the objective lens.

Further, the diameter of the laser beam constantly incident on the objective lens should be large enough to cope with the shift of the objective lens, and thereby the loss of the quantity of light becomes extremely larger.

This invention eliminates the above-noted drawbacks.

The objective lens apparatus according to the present invention eliminates the optical modulation of the laser beam caused by rotation of the objective lens holder in the tracking direction and improves the S/N (signal/noise) ratio of a signal detected from the laser beam. Further, the loss of the quantity of light is reduced.

DETAILED DESCRIPTION OF THE INVENTION

According to the present invention, a laser beam incident on the center axis of the objective lens holder is shifted parallell by means of a prism so as to be incident on the objective lens, whereby the prism rotates together with the rotation of the objective lens holder so that the optical axis of the laser beam may always coincide with the optical axis of the objective lens.

Figure 1:
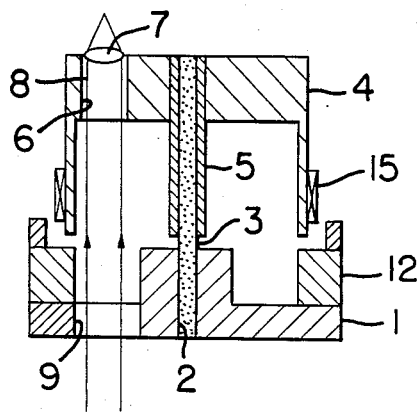
FIG. 1 is a front view of a conventional objective lens apparatus.
Figure 2:
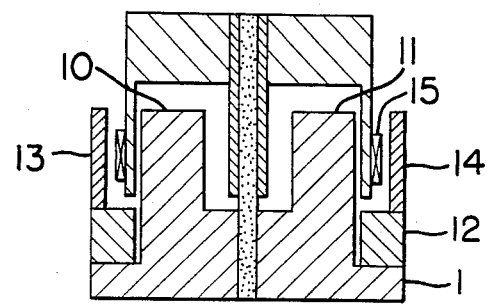
FIG. 2 is a side elevation of FIG. 1.
Figure 3:
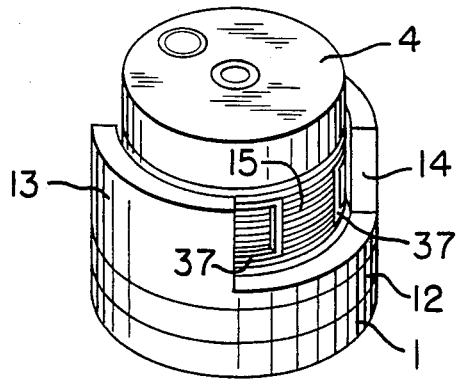
FIG. 3 is a perspective view of FIG. 1.

FIGS. 1, 2 and 3 show a simplified construction of the conventional objective lens apparatus.

FIG. 1 shows a front view of a conventional objective lens apparatus. A lower end of a metallic thin shaft 3 is inserted into a center throughhole 2 of a disk-shaped base plate 1 to be secured perpendicularly as shown in FIG. 1. A bearing 5 of an objective lens holder 4 is inserted onto the shaft 3 pivotably and slidably in the thrust direction. A lens hole 6 is perpendicularly perforated through the objective lens holder 4. A lens frame 8, in which an objective lens 7 is fit, is inserted into the lens hole 6. An optical aperture 9 is provided at the base plate 1 directly under the objective lens 7 to pass a laser beam and to the objective lens 7.

FIG. 2 shows a side elevation of the conventional objective lens apparatus shown in FIG. 1. A pair of first yoke portions 10 and 11 made of magnetic material are made in one body with the base plate 1 as shown in FIG. 2. A ring-shaped magnet 12 is secured to the outer peripheral portion on the base plate 1 as shown in FIGS. 1 and 2. A pair of second yoke portions 13 and 14 are secured to the upper side surface of the magnet 12. The first yoke portions 10, 11 and the second yoke portions 13,14 coact with the magnet 12 to define flux generating means for generating a magnetic flux which flows across the gaps between the opposed first and second yoke portions. A first coil 15 interacts with the magnetic flux for focal adjustment and is wound around the outer surface of the objective lens holder 4 and sandwiched between the first yoke portions 10 and 11 and the second yoke portions 13 and 14. A linear motor for driving the objective lens holder 4 in the thrust direction is constructed by the first coil, the first yoke portions 10, 11 and the second yoke portions 13, 14.

As shown in FIG. 3, a square second coil 37 interacts with the magnetic flux for tracking adjustment and is adhered overlying the surface of the first coil 15 wound around the outer surface of the objective lens holder 4. A rotatable motor for driving the objective lens holder 4 in the tracking direction is constructed by the second coil 37, the first yoke portions 10, 11 and the second yoke portions 13, 14.

The conventional objective lens apparatus is constructed as mentioned above. The objective lens holder 4 is supported in the condition that it can be displaced in the focal direction (in the direction of the axis shaftline of the shaft 3) and in the tracking direction (in the rotation direction of the shaft 3).

Hereinafter several embodiments of the present invention will be illustrated in conjunction with the drawings. In the following description, parts which are the same or similar to those described above with reference to FIGS. 1-3 will not be further described.

Figure 4:
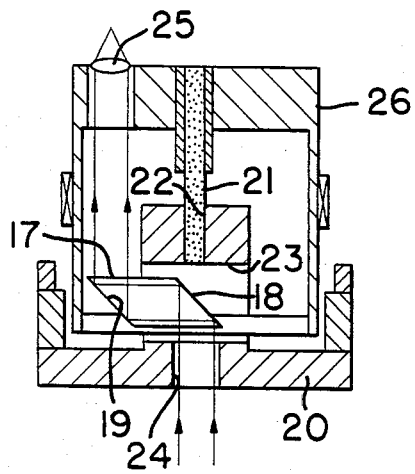
FIG. 4 is a front view showing an embodiment of an objective lens apparatus according to the present invention.
Figure 5:
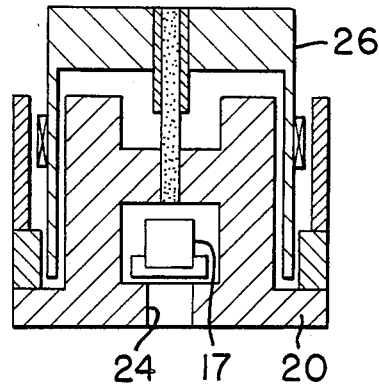
FIG. 5 is a side elevation of FIG. 4.

FIG. 4 is a front view of an objective lens apparatus, and FIG. 5 is a side elevation of FIG. 4. Two surfaces of a square pillar glass prism 17, whose top and bottom surfaces are rectangular and whose opposed side surfaces are in the shape of a parallelogram having angles of 45°, are used as reflection surfaces 18, 19 for the laser beam as shown in FIG. 4. A disk-shaped base plate 20 has a hole 22, positioned higher than that of the corresponding hole in the conventional base plate 1, to insert a shaft 21. A hole 23 of sufficient size to accommodate the glass 17 is provided under the hole 22, and an optical aperture 24 dimensioned to pass a laser beam is provided at the center of the base plate 20 under the hole 23. The glass prism 17 is positioned and secured to an objective lens holder 26 of cylindrical shape and in which an objective lens 25 is fit so that a laser beam entering from underneath through the aperture 24 along the center axis of the objective lens apparatus is incident on the objective lens 25 after being reflected by the reflection surfaces 18 and 19. By such a construction, even if the objective lens holder 26 rotates in the tracking direction, the optical axis of the laser beam does not shift or deviate from the optical axis of the objective lens 25 since the reflection surfaces 18 and 19 rotate simultaneously with the objective lens holder. As a result, a fixed quantity of light of the laser beam is constantly incident on the objective lens 25, and thereby optical modulation caused by the rotation of the objective lens holder 26 is eliminated. Further, if the laser beam diameter equals the objective lens diameter, a loss of the quantity of light can be reduced.

Although a pair of surfaces of the square pillar glass prism are used for reflection surfaces, it is to be noted that a pair of or a plurality of reflection plates can also be used instead.

Construction of another embodiment of the objective lens apparatus according to the present invention will be described with reference to FIGS. 6 and 7.

Figure 6:
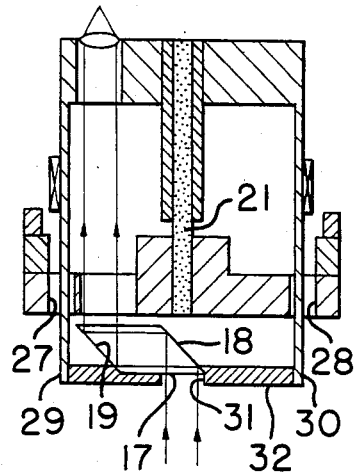
FIG. 6 is a front view showing another embodiment of an objective lens apparatus according to the present invention.
Figure 7:
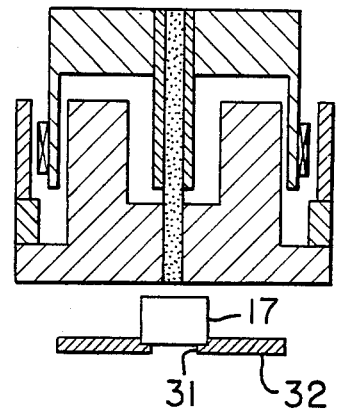
FIG. 7 is a side elevation of FIG. 6.

FIG. 6 is a front view of an objective lens apparatus, and FIG. 7 is a side elevation of FIG. 6. Two portions 29 and 30 of the cylindrical objective lens holder 26 extend downward and are inserted into two throughholes 27 and 28 provided on the base plate 20. To the ends of the two portions 29 and 30 are attached a plate 32 on which the square pillar glass prism 17 is provided and at the center of which is formed a hole 31. The position of the plate 32 is adjusted so that the laser beam incident on the center hole 31, whose optical axis is coincident with the shaft 21, may be led to the objective lens.

Figure 8:
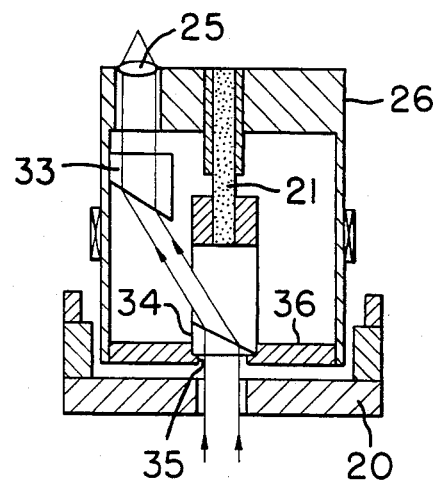
FIG. 8 is a front view showing a further embodiment of an objective lens apparatus according to the present invention.

FIG. 8 shows another embodiment of the present invention, in which plural prisms are used instead of a single prism having plural reflection surfaces. A prism 33 is attached under the objective lens 25 inside the objective lens holder 26 and a prism 34 is attached to a prism supporting plate 36 which has a hole 35 at the center thereof. The prism supporting plate 36 is secured to the lower portion of the objective lens holder 26 so that the incident laser beam using the shaft 21 as the optical axis is led to the objective lens 25. As illustrated, when the shaft 21 of the incident beam coincides with the optical axis of the hole 35, the optical axis of the reflection light comes to coincide the shaft.

What we claim is:

1. An objective lens apparatus for an optical disc player comprising: an objective lens holder rotatable about a center axis; an objective lens mounted on said objective lens holder at a location spaced from said center axis; optical means for leading light to said objective lens in a direction parallel to said center axis after passing along said center axis, the optical means being mounted to undergo rotation simultaneously with said objective lens holder; means for generating magnetic flux; and means including tracking and focusing coils interacting with said magnetic flux for effecting tracking and focusing adjustments of said objective lens holder.

2. An objective lens apparatus as claimed in claim 1; wherein said optical means comprises a pillar glass prism having opposed side surfaces in the shape of a parallelogram.

3. An objective lens apparatus as claimed in claim 1; wherein said optical means is secured at the bottom of said objective lens holder.

4. An objective lens apparatus as claimed in claim 1; wherein said optical means comprises a combination of plural prisms.

5. An objective lens apparatus as claimed in claim 1; wherein said optical means comprises a combination of plural reflection plates.

6. An objective lens apparatus as claimed in claim 1; wherein said light is a laser beam.

7. An objective lens apparatus as claimed in claim 1; wherein said objective lens holder has a cylindrical shape.

8. An objective lens apparatus as claimed in claim 1; wherein said tracking and focusing coils are disposed on the objective lens holder.

9. A lens assembly for an optical disc player comprising: a lens holder having a center axis; means mounting the lens holder for angular displacement about the center axis and linear displacement along the center axis; an objective lens mounted on the lens holder at a location spaced radially outwardly from the center axis; optical means carried by the lens holder to undergo angular displacement concurrently therewith for optically directing light which is incident along the center axis to the objective lens in a direction parallel to the center axis; and means for selectively effecting angular and linear displacements of the lens holder.

10. A lens assembly according to claim 9; wherein the means for effecting angular and linear displacements of the lens holder comprises electromagnetic means for electromagnetically displacing the lens holder.

11. A lens assembly according to claim 10; wherein the electromagnetic means comprises energizeable tracking and focusing coils, and means for generating a magnetic flux which coacts with the magnetic fluxes generated when the tracking and focusing coils are energized to effect angular and linear displacements of the lens holder.

12. A lens assembly according to claim 11; wherein the tracking and focusing coils are disposed on the lens holder.

13. A lens assembly according to claim 9; wherein the optical means includes first means disposed along the center axis for receiving light incident along the center axis and directing the light radially outwardly, and second means for receiving the radially outwardly directed light and directing the same to the objective lens in a direction parallel to the center axis.

14. A lens assembly according to claim 13; wherein at least one of the first and second means comprises a light-reflecting surface.

15. A lens assembly according to claim 13; wherein both of the first and second means comprise light-reflecting surfaces.

16. A lens assembly according to claim 13; wherein at least one of the first and second means comprises a prism.

17. A lens assembly according to claim 13; wherein both of the first and second means comprise prisms.

18. A lens assembly according to claim 13; wherein the lens holder has a cylindrical shape and within which is mounted the optical means.

* * * * *